(12) United States Patent
Shurie

(10) Patent No.: US 11,820,505 B2
(45) Date of Patent: Nov. 21, 2023

(54) AIRPLANE EMERGENCY ESCAPE DRONE

(71) Applicant: Jaffer Shurie, Silver Spring, MD (US)

(72) Inventor: Jaffer Shurie, Silver Spring, MD (US)

(*) Notice: Subject to any disclaimer, the term of this patent is extended or adjusted under 35 U.S.C. 154(b) by 22 days.

(21) Appl. No.: 17/152,935

(22) Filed: Jan. 20, 2021

(65) Prior Publication Data
US 2021/0221522 A1    Jul. 22, 2021

Related U.S. Application Data

(60) Provisional application No. 62/965,514, filed on Jan. 24, 2020, provisional application No. 62/963,404, filed on Jan. 20, 2020.

(51) Int. Cl.
| | |
|---|---|
| *B64C 39/02* | (2023.01) |
| *B64D 27/24* | (2006.01) |
| *B64D 11/06* | (2006.01) |
| *B64C 25/58* | (2006.01) |
| *A62B 1/00* | (2006.01) |
| *B64D 25/18* | (2006.01) |
| *A62B 1/02* | (2006.01) |
| *B64U 10/13* | (2023.01) |
| *B64U 30/20* | (2023.01) |
| *B64U 50/19* | (2023.01) |
| *B64U 101/00* | (2023.01) |
| *B64U 101/60* | (2023.01) |

(52) U.S. Cl.
CPC .............. *B64C 39/024* (2013.01); *A62B 1/00* (2013.01); *A62B 1/02* (2013.01); *B64C 25/58* (2013.01); *B64D 11/062* (2014.12); *B64D 25/18* (2013.01); *B64D 27/24* (2013.01); *B64U 10/13* (2023.01); *B64U 30/20* (2023.01); *B64U 50/19* (2023.01); *B64U 2101/00* (2023.01); *B64U 2101/60* (2023.01); *B64U 2201/10* (2023.01)

(58) Field of Classification Search
CPC ... B64C 27/20; B64C 27/08; B64C 2201/027; B64C 2201/128
See application file for complete search history.

(56) References Cited

U.S. PATENT DOCUMENTS

| | | | | |
|---|---|---|---|---|
| 5,295,643 | A * | 3/1994 | Ebbert | B64C 39/024 428/117 |
| 9,586,683 | B1 * | 3/2017 | Buchmueller | B64C 39/024 |
| 10,946,705 | B1 * | 3/2021 | Neuman | B64C 27/12 |
| 2002/0125367 | A1 * | 9/2002 | Killingsworth | B60F 3/00 244/17.11 |
| 2002/0195518 | A1 * | 12/2002 | Killingsworth | B64C 35/008 244/7 A |

(Continued)

*Primary Examiner* — Richard Green
*Assistant Examiner* — Arfan Y. Sinaki
(74) *Attorney, Agent, or Firm* — Boudwin Intellectual Property Law, LLC; Daniel Boudwin

(57) ABSTRACT

An airplane emergency escape drone is shown and described. The airplane emergency escape drone includes a life support system secured within a housing with a compressed air tank that controls the amount of oxygen from an oxygen tank and air from an air tank released into the housing. The airplane emergency escape drone also includes an inflatable floatation device secured to the housing. The airplane emergency escape drone also includes propellers having safety grates underneath the propellers. The airplane emergency escape drone also includes a CPU that is in connection with a video control system that includes a video input component and a signal transmitter.

11 Claims, 4 Drawing Sheets

(56) References Cited

U.S. PATENT DOCUMENTS

| | | | | |
|---|---|---|---|---|
| 2003/0080250 A1* | 5/2003 | Velden | .................... | B64D 25/12 |
| | | | | 244/118.5 |
| 2007/0119003 A1* | 5/2007 | Hutton | .................... | B64F 1/305 |
| | | | | 14/71.5 |
| 2009/0008499 A1* | 1/2009 | Shaw | ....................... | B64C 27/08 |
| | | | | 244/17.23 |
| 2013/0208490 A1* | 8/2013 | Savian | ..................... | B60Q 3/43 |
| | | | | 362/471 |
| 2015/0175258 A1* | 6/2015 | Lee | ......................... | B64C 27/14 |
| | | | | 244/17.23 |
| 2016/0207368 A1* | 7/2016 | Gaonjur | ................... | B64C 37/00 |
| 2017/0166309 A1* | 6/2017 | Sekiya | ................. | B64D 11/062 |
| 2017/0341725 A1* | 11/2017 | Skahan | ................. | B64C 13/044 |
| 2018/0346136 A1* | 12/2018 | Arkus | .................... | B64D 27/08 |
| 2019/0023428 A1* | 1/2019 | Veselka | ..................... | B64G 1/60 |
| 2019/0168877 A1* | 6/2019 | Agajanian | ............... | B64C 1/069 |
| 2019/0233077 A1* | 8/2019 | Tian | ......................... | B64C 27/26 |
| 2020/0180754 A1* | 6/2020 | Schonfelder | ............. | B64D 1/22 |
| 2021/0261253 A1* | 8/2021 | Hanna | .................... | B60L 50/66 |

* cited by examiner

AIRPLANE EMERGENCY ESCAPE DRONE

CROSS REFERENCE TO RELATED APPLICATIONS

This application claims the benefit of U.S. Provisional Application No. 62/965,514 filed on Jan. 24, 2020 and U.S. Provisional Application No. 62/963,404 filed on Jan. 20, 2020. The above identified patent application is herein incorporated by reference in its entirety to provide continuity of disclosure.

BACKGROUND OF THE INVENTION

The present invention relates to an emergency escape drone. More particularly, the present invention provides a manned drone capable of safely flying at least one person from an airplane.

In an airplane emergency there are currently only two options of escape. First, a pilot may make an emergency landing. An emergency landing is extremely dangerous as there may not be an adequate runway. This means that a plane could become damaged on landing and cause injury or even death to passengers. Further, in some instances an emergency landing may not be possible depending on circumstances.

The second option for escaping a plane during an emergency is a parachute. A parachute may safely allow an individual to escape a plane. However, without proper training a parachute can be deadly. Further, parachutes must be routinely inspected repacked and the cords replaced in order to remain safe. This means that parachutes are not cost effective means of escape nor are they an overly safe option.

Consequently, there is a need for an improvement in the art of airplane safety. The present invention substantially diverges in design elements from the known art while at the same time solves a problem many people face when there is an emergency in an airplane that requires an escape. In this regard the present invention substantially fulfills these needs.

SUMMARY OF THE INVENTION

The present invention provides an airplane emergency escape drone wherein the same can be utilized for providing convenience for the user when using an airplane emergency escape drone. The airplane emergency escape drone is comprised of a housing. The housing is made from a planar base, a plurality of sidewalls rising from the base and a planar top secured to the top of the sidewalls. A door is located within one of the plurality of sidewalls. A motor is secured to the exterior of the planar top. A propeller is rotatably secured to the motor. A plurality of feet is secured to the exterior of the planar base.

Another object of the airplane emergency escape drone is to provide a CPU operably coupled to the motor. The CPU has an autopilot loaded into it and is configured to operate the drone to the ground from an airplane.

Another object of the airplane emergency escape drone is to provide a housing which is made from carbon fiber.

Another object of the airplane emergency escape drone is to provide at least one seat located within the housing.

Another object of the airplane emergency escape drone is to provide a housing which has an air tight seal when the door is in a closed position.

Another object of the airplane emergency escape drone is to provide at least one parachute operably coupled to the exterior of the planar top.

Another object of the airplane emergency escape drone is to provide a life support system secured within the housing.

Another object of the airplane emergency escape drone is to provide a life support system which includes an oxygen system.

Another object of the airplane emergency escape drone is to provide a plurality of feet which are shock absorbing feet.

Another object of the airplane emergency escape drone is to provide an inflatable floatation device secured to the housing.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
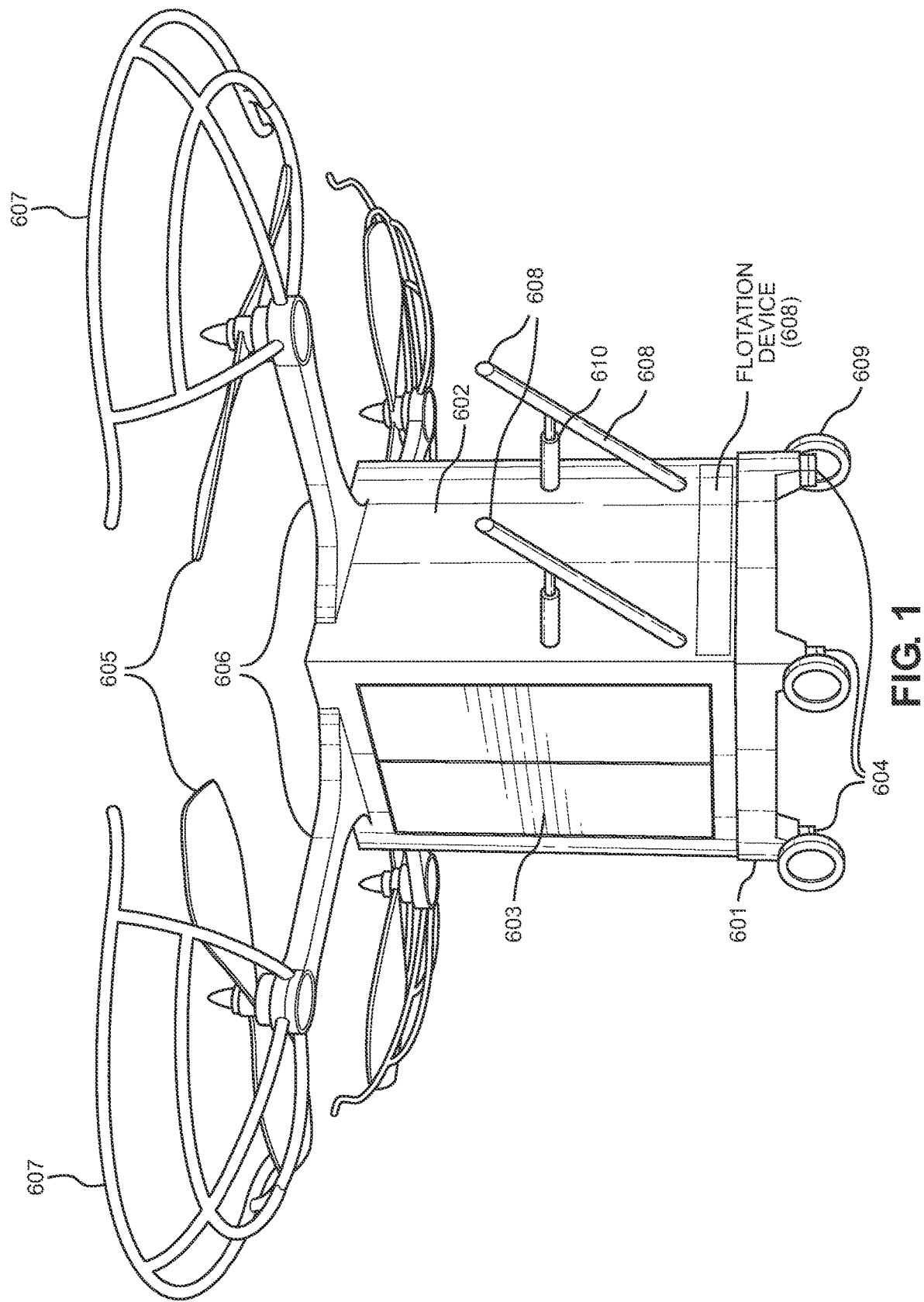
FIG. 1 shows a perspective view of an embodiment of the airplane emergency escape drone.

Reference is made herein to the attached drawings. Like reference numerals are used throughout the drawings to depict like or similar elements of the airplane emergency escape drone. For the purposes of presenting a brief and clear description of the present invention, a preferred embodiment will be discussed as used for the airplane emergency escape drone. The figures are intended for representative purposes only and should not be considered to be limiting in any respect.

Referring now to FIG. 1, there is shown a perspective view of an embodiment of the airplane emergency escape drone. The airplane emergency escape drone includes a housing having a base 601. In one embodiment, the base 601 has a rectangular cross-section. In another embodiment, the base 601 is of a different shape. A plurality of sidewalls 602 rises from the base 601. In one embodiment, the sidewalls are made from aluminum. A ceiling is secured to the top of the plurality of sidewalls 602. This will create an interior volume. The housing has a generally square shape of the like.

A door 603 is located through at least one sidewall 602. In one embodiment, the door 603 is a sliding door. In another embodiment, the door 603 is secured with hinges. In yet a further embodiment, the door 603 is a hatch style door. In one embodiment, the housing and the door 603 creates an air tight chamber.

The base 601 has a plurality of feet 604 secured thereto. The plurality of feet 604 will support the drone away from a ground surface. In one embodiment, the plurality of feet 604 are an integral part of the base 601. In another embodiment, the plurality of feet 604 are removably secured to the base 601. In some embodiments, as described in the description of FIG. 3, the plurality of feet 604 function as shock absorbers.

There is a plurality of propellers 605 secured to a top of the housing. When spun, the propellers 605 will create lift of the drone. The propellers 605 will be secured to a motor as described in FIG. 4 and FIG. 5. In one embodiment, each of the plurality of propellers 605 are secured to an arm 606. The arm 606 will allow for the propellers 605 to be spaced away from the housing allowing for larger propellers to be used.

In one embodiment, there are safety grates 607 located under the propellers 605. The safety grates 607 will prevent individuals from being caught in the propellers. In one embodiment, the safety grates 607 are made from metal. This will ensure that the safety grates 607 do not become damaged. As shown in FIG. 1, the safety grates 607 are linear safety grates that extend round the propellers 605.

In some embodiments, there is a floatation device 608 located about the exterior of the base 601. In one embodiment, the floatation device 608 is an inflatable device. This will allow the device to be folded for storage and then to inflate as needed. In one embodiment, the floatation device 608 will automatically inflate upon contact with water. In the shown embodiment the flotation device 608 is in a storage configuration is within a compartment disposed on the base, such that the floatation device doesn't impact aerodynamics of the drone in flight.

In one embodiment, the airplane emergency escape drone includes a plurality of deployable wheels 609. In this embodiment the deployable wheels 609 are disposed at one end of wheel posts 608. The other end of the wheel post 608 is rotatably coupled to the drone. In one embodiment a hydraulic cylinder 610 is secured to the wheel post 608 such that it will deploy the wheels to the ground as desired. The wheels 609 will enable the drone to be driven if needed. The wheels 609 will be operably coupled to a drive system which will be controlled from within the drone.

Figure 2:
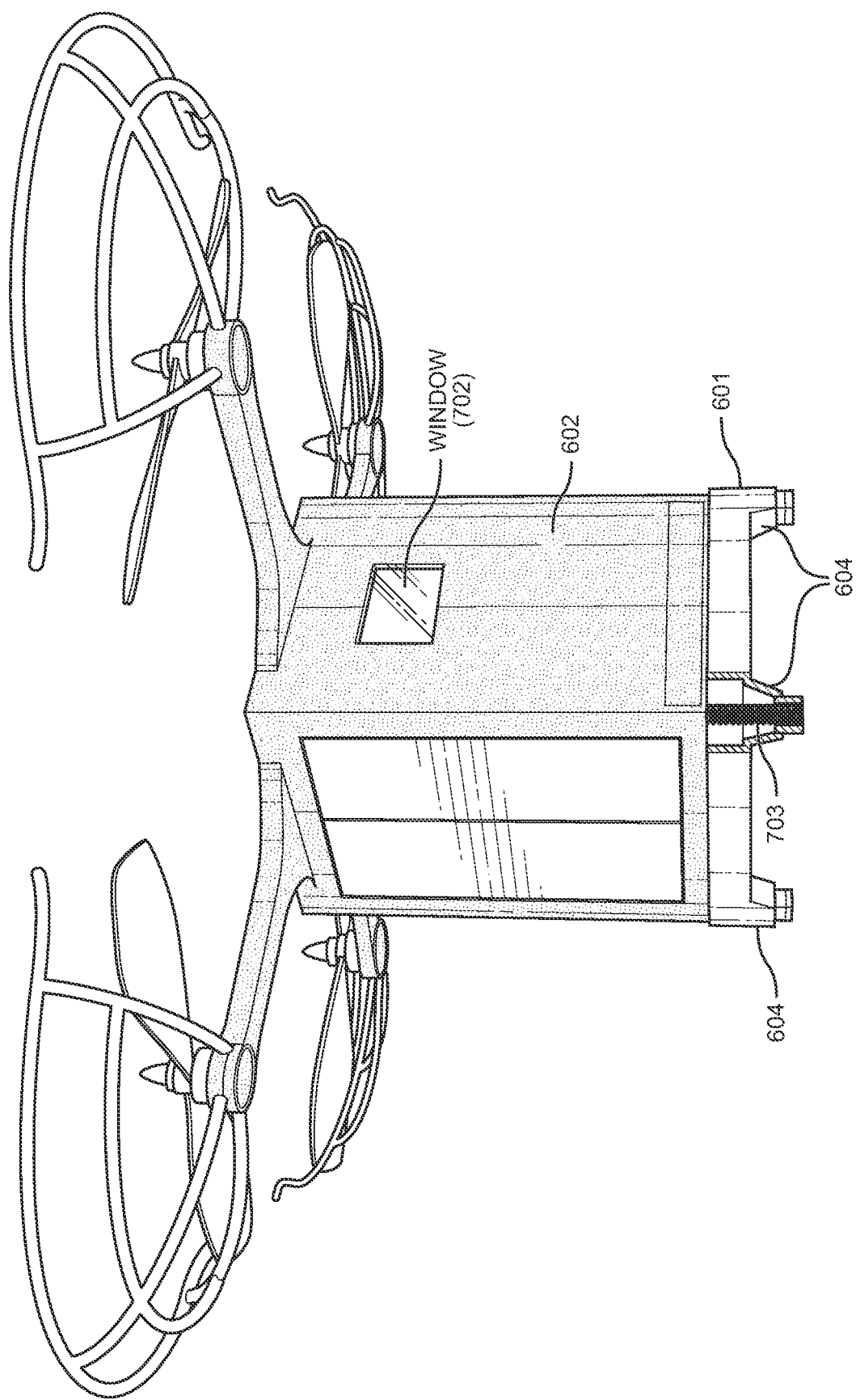
FIG. 2 shows a perspective view of an embodiment of the airplane emergency escape drone.

Referring now to FIG. 2, there is shown a perspective view of an embodiment of the airplane emergency escape drone. In the shown embodiment, the housing of the airplane emergency escape drone is made from carbon fiber. This will allow for a light weight housing to be created. Further, carbon fiber will withstand elements such as those accustom to high altitudes and bad weather. In some embodiments, the base 601 is made from a different material than the rest of the housing. This will allow for a base made of a material stronger than carbon fiber.

In some embodiments, there is at least one window 702 located within at least one of the plurality of sidewalls 602. The at least one window 702 will allow an individual to see out of the drone. In one embodiment, the at least one window 702 is secured such that the housing has an airtight seal. In another embodiment, the window 702 is removably secured within the at least one sidewall 602.

In different embodiments, each of the plurality of feet 604 function as shock absorbers. This will absorb the force exerted on the housing when the drone is landing. In one embodiment, the shock absorption is created by air shocks placed within the plurality of feet 604. In another embodiment, the shock absorption is created by hydraulic shocks placed within the plurality of feet 604. In the shown embodiment, the shock absorption is created by springs 703 placed within the plurality of feet 604.

Figure 3:
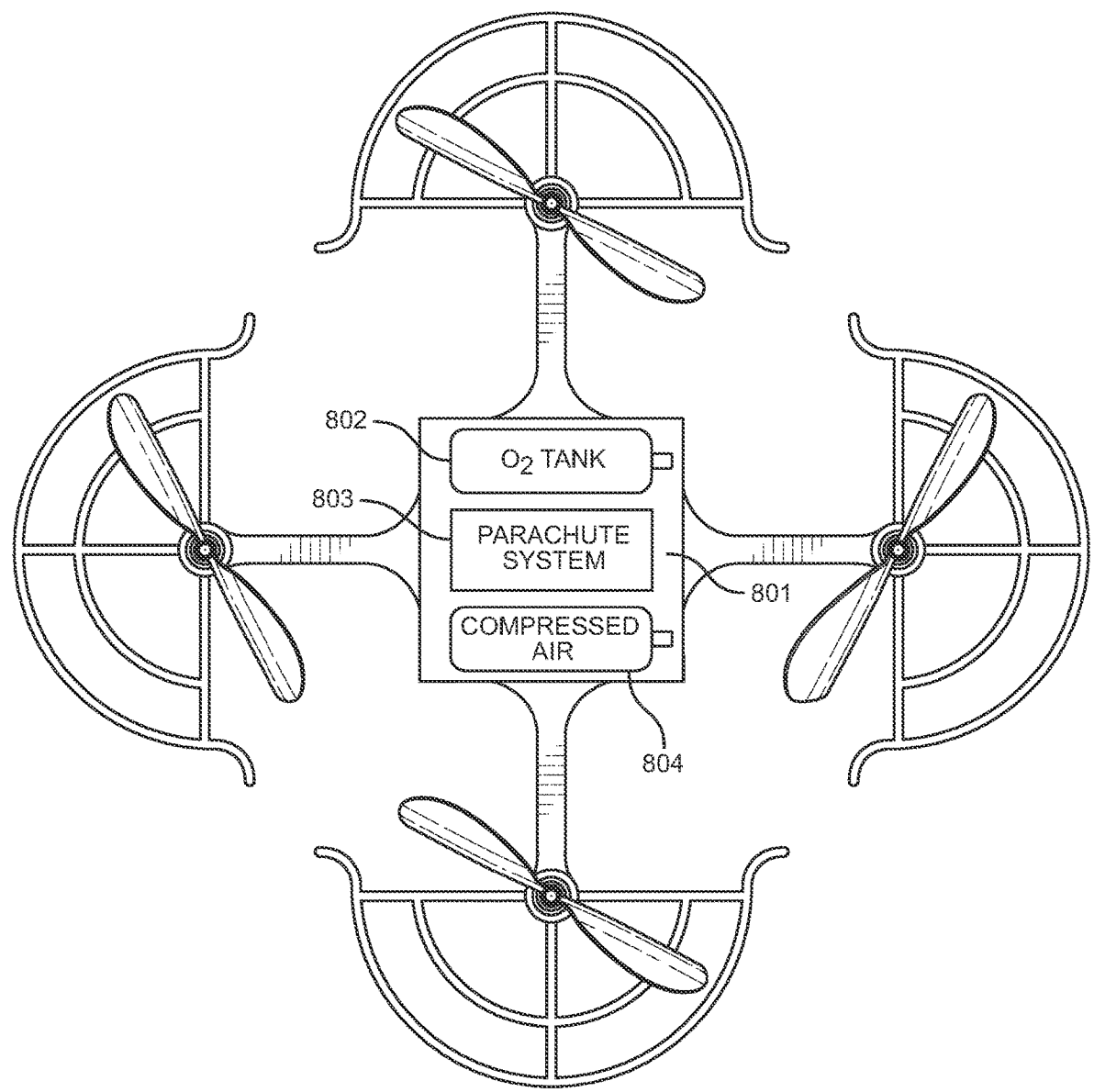
FIG. 3 shows a top down view of an embodiment of the airplane emergency escape drone.

Referring now to FIG. 3, there is shown a top down view of an embodiment of the airplane emergency escape drone. In one embodiment, the ceiling 801 includes various safety components. In one embodiment, there is at least one oxygen tank 802 secured to the ceiling 801. The at least one oxygen tank 802 is fluidly connected to a life support system. This will allow for oxygen to be pumped into the housing.

In another embodiment, the ceiling 801 will further have at least one parachute 803 secured thereto. The at least one parachute 803 is in a folded configuration for storage on the ceiling 801. The at least one parachute 803 is secured to the ceiling 801 such that upon deployment the at least one parachute 803 will allow the drone to float toward a ground surface. In one embodiment, the parachute 803 will be set to automatically deploy in the event that a drone failure is detected.

In a further embodiment, at least one compressed air tank 804 is secured to the ceiling 801. In one embodiment, the at least one compressed air tank 804 is fluidly coupled to the air shock system. This will allow the shocks to have varying pressure. In another embodiment, the at least one compressed air tank 804 is fluidly connected to the floatation device. This will allow the floatation device to be quickly inflated. In yet another embodiment, the at least one compressed air tank 804 is fluidly connected to the interior of the housing. This will allow the oxygen to be diluted to match that of the atmosphere. This will allow the oxygen to last longer.

Figure 4:
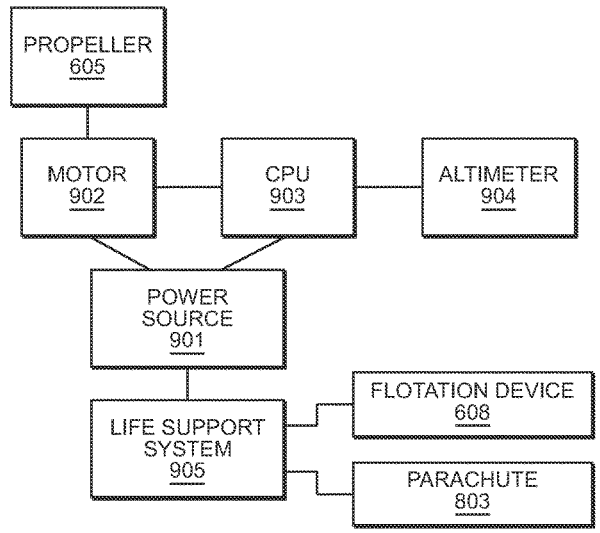
FIG. 4 shows a wiring diagram of an embodiment of the airplane emergency escape drone.

Referring now to FIG. 4, there is shown a wiring diagram of an embodiment of the airplane emergency escape drone. The airplane emergency escape drone includes a power source 901. In one embodiment, the power source 901 is a battery. The power source is electrically connected to at least one motor 902. The at least one motor 902 is coupled to each of the plurality of propellers 605. In one embodiment, there is a motor 902 connected to each of the propellers 605. In one embodiment, the at least one motor 902 is rotatably coupled to each of the plurality of propellers 605.

The at least one motor 902 and the power source 901 are electrically coupled to a CPU 903. The CPU will control the drone. In one embodiment the CPU 903 will contain an autopilot program. The autopilot program will get the drone from an elevation to a ground surface safely. In some embodiments, the CPU 903 is electrically coupled to an altimeter 904. The altimeter 904 will allow the CPU 903 to determine the height of the drone.

The life support system 905 is electrically coupled to the power source 901. The life support system 905 is further electrically coupled to the CPU 903. The life support system 905 will control the amount of oxygen and air released into the housing. In other embodiment the life support system will control the deployment of the parachute 803. In yet another embodiment the life support system will control the deployment of the floatation device 608.

Figure 5:
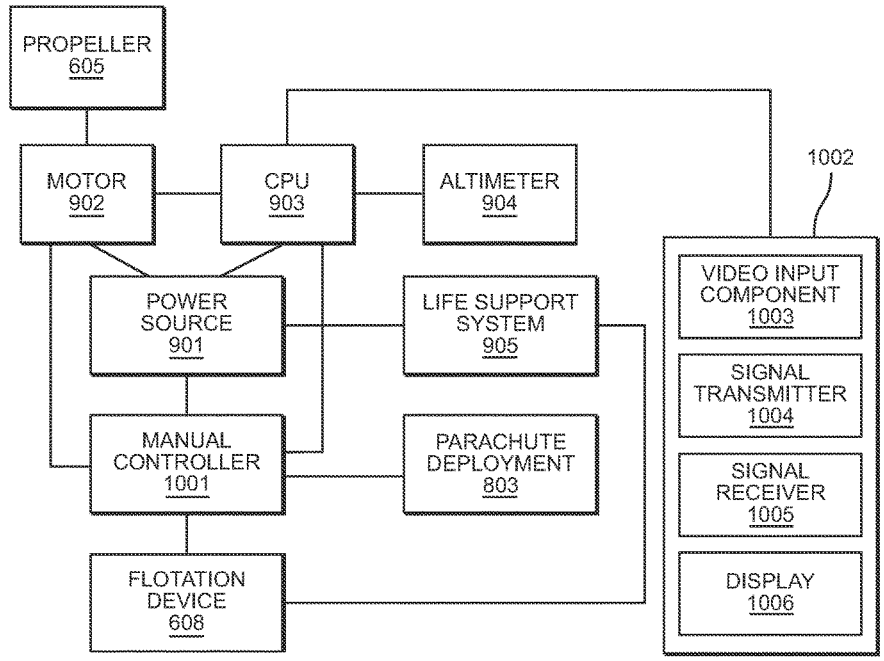
FIG. 5 shows a wiring diagram of an embodiment of the airplane emergency escape drone.

Referring now to FIG. 5, there is shown a wiring diagram of an embodiment of the airplane emergency escape drone. In some embodiments, there is a manual controller 1001. The manual controller 1001 will be located within the housing. This will allow an individual to control various functions of the drone.

The controller 1001 is electrically coupled to the power source 901. The controller 1001 is further electrically coupled to the CPU 903. In one embodiment, the controller 1001 is coupled to the at least one motor 902. In one embodiment, the controller 1001 is electrically coupled to the floatation device 608. In another embodiment, the controller 1001 is connected to the parachute 803. This will allow a user to control the various features of the drone.

In a further embodiment, the CPU 903 is in further operable connection with a video control system 1002. The video control system 1002 comprises a video input component 1003, such as a camera, a signal transmitter 1004, a signal receiver 1005, and a display 1006. The video input component 1003 captures video and audio data before transmitted the video and audio data via the signal transmitter 1004. Video and audio data are received via the signal receiver 1005 and is played back via the display 1006. As such, individuals within the airplane emergency escape drone may video chat with individuals at a separate location.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An airplane emergency escape drone, comprising:
    a generally square-shaped housing having a planar base, a plurality of sidewalls rising from the planar base, and a planar top secured to a top of the plurality of sidewalls;
    a door located within one of the plurality of sidewalls;
    a plurality of propellers secured to an exterior surface of one of the plurality of sidewalls, adjacent to the planar top, such that the plurality of propellers are vertically elevated above the generally square-shaped housing; each of the plurality of propellers are in operable connection with a motor;
    a plurality of feet secured to an exterior of the planar base;
    a CPU operably coupled to the motor;
    a plurality of safety grates;
    a life support system secured within the generally square-shaped housing;
    wherein the life support system includes an oxygen tank secured to an interior surface of the planar top;
    wherein each propeller of the plurality of propellers comprises one of the plurality of safety grates underneath the propeller;
    wherein the life support system further comprises a compressed air tank secured to the interior surface of the planar top, and the life support system is configured to control an amount of oxygen from the oxygen tank and air from the compressed air tank released into the generally square-shaped housing;
    further comprising a plurality of deployable wheels;
    a hydraulic cylinder secured to a wheel post;
    at least one parachute operably coupled to an exterior of the planar top; and
    wherein the CPU is in further connection with a video control system.

2. The airplane emergency escape drone of claim 1, wherein the CPU has an autopilot configured to operate the airplane emergency escape drone to the ground surface from an airplane.

3. The airplane emergency escape drone of claim 1, wherein the generally square-shaped housing is made from carbon fiber.

4. The airplane emergency escape drone of claim 1, wherein the generally square-shaped housing forms an airtight seal when the door is in a closed position.

5. The airplane emergency escape drone of claim 1, wherein the plurality of feet are shock absorbing feet.

6. The airplane emergency escape drone of claim 1, further comprising an inflatable floatation device secured to the generally square-shaped housing.

7. The airplane emergency escape drone of claim 1, further comprising a controller operably secured to the motor, wherein the controller operates the airplane emergency escape drone.

8. The airplane emergency escape drone of claim 1, wherein the plurality of sidewalls extends substantially perpendicular upward from the planar base.

9. The airplane emergency escape drone of claim 1, wherein the planar base has a rectangular cross-section.

10. The airplane emergency escape drone of claim 1, wherein the video control system comprises a video input component and a signal transmitter.

11. The airplane emergency escape drone of claim 10, wherein the video input component captures video and audio data before transmitting the video and audio data via the signal transmitter.

* * * * *